(12) United States Patent
Gibson et al.

(10) Patent No.: US 11,569,741 B2
(45) Date of Patent: Jan. 31, 2023

(54) COMPENSATION IN A VOLTAGE MODE SWITCH-MODE CONVERTER

(71) Applicant: TEXAS INSTRUMENTS INCORPORATED, Dallas, TX (US)

(72) Inventors: Neil Gibson, Freising (DE); Stefan Herzer, Marzling (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 50 days.

(21) Appl. No.: 16/950,660

(22) Filed: Nov. 17, 2020

(65) Prior Publication Data

US 2022/0158554 A1 May 19, 2022

(51) Int. Cl.
*H02M 3/158* (2006.01)

(52) U.S. Cl.
CPC .................. *H02M 3/158* (2013.01)

(58) Field of Classification Search
CPC .... H02M 3/158; H02M 3/1582; H02M 3/157; H02M 3/156; H02M 3/155
See application file for complete search history.

(56) References Cited

U.S. PATENT DOCUMENTS

| | | | | |
|---|---|---|---|---|
| 8,981,747 B2* | 3/2015 | Saito | ...................... | G05F 1/575 323/280 |
| 2011/0285370 A1* | 11/2011 | Gritti | .................... | H02M 3/156 323/282 |
| 2015/0180338 A1* | 6/2015 | Choi | ..................... | H02M 3/156 323/271 |

* cited by examiner

*Primary Examiner* — Nguyen Tran
(74) *Attorney, Agent, or Firm* — Ray A. King; Frank D. Cimino

(57) ABSTRACT

In some examples, a circuit comprises a first field effect transistor (FET) having a first gate adapted to couple to a reference voltage source, a first source coupled to a first current source, and a first drain coupled to a second current source. The circuit comprises a second FET having a second gate coupled to the first drain, a second drain coupled to the first current source, and a second source coupled to a first resistor. The circuit comprises a third FET having a third gate adapted to couple to a feedback loop of a voltage converter, a third source coupled to a third current source, and a third drain coupled to a fourth current source. The circuit comprises a fourth FET having a fourth gate coupled to the third drain, a fourth drain coupled to the third current source, and a fourth source coupled to a second resistor.

19 Claims, 2 Drawing Sheets

COMPENSATION IN A VOLTAGE MODE SWITCH-MODE CONVERTER

BACKGROUND

Step-down converters (e.g., buck converters) are power converters that receive an input voltage and provide a reduced (or stepped-down) voltage. Step-down converters can use many different architectures. In step-down converters having a voltage mode architecture, a compensation network provides a feedback control loop from an output of the converter to an input of the converter to help stabilize the converter. A converter is stable if it produces a finite output responsive to every finite input. An unstable system may include jittering in the switching waveforms, oscillation of output voltage, overheating of transistors, and so on. Compensation networks provide stability for the converter but over-compensation can lead to low bandwidth and slow transient response. Compensation networks can also be used to increase the frequency range of the output.

SUMMARY

In accordance with at least one example of the description, a system includes a first field effect transistor (FET) having a first FET gate adapted to couple to a reference voltage source, a first FET source coupled to a first current source, and a first FET drain coupled to a second current source. The system includes a second FET having a second FET gate coupled to the first FET drain, a second FET drain coupled to the first current source, and a second FET source coupled to a first resistor. The system also includes a third FET having a third FET gate adapted to couple to a feedback loop of a voltage converter, a third FET source coupled to a third current source, and a third FET drain coupled to a fourth current source. The system includes a fourth FET having a fourth FET gate coupled to the third FET drain, a fourth FET drain coupled to the third current source, and a fourth FET source coupled to a second resistor.

In accordance with at least one example of the description, a system includes a first FET having a first FET gate adapted to couple to a reference voltage source, a first FET source coupled to a first current source, and a first FET drain coupled to a second current source. The system also includes a second FET having a second FET gate coupled to the first FET drain, a second FET drain coupled to the first current source, and a second FET source coupled to a first resistor, wherein the first current source, the second current source, and the reference voltage source are configured to bias the first FET and the second FET in a super source follower configuration. The system also includes a third FET having a third FET source coupled to a third current source, a third FET drain coupled to a fourth current source, and a third FET gate adapted to couple to a feedback loop of a voltage converter, the third FET gate configured to receive a voltage from the feedback loop. The system also includes a fourth FET having a fourth FET gate coupled to the third FET drain, a fourth FET drain coupled to the third current source, and a fourth FET source coupled to a second resistor, wherein the third FET and the fourth FET are configured to be biased in a super source follower configuration by the third current source, the fourth current source, and the voltage from the feedback loop. In the system, a voltage output coupled between the second FET source and the fourth FET source is configured to compensate the voltage converter by increasing a phase margin and a gain margin of the voltage converter.

In accordance with at least one example of the description, a system includes a first FET coupled to a second FET in a super source follower configuration, the first FET having a first FET gate coupled to a reference voltage source. The system includes a third FET coupled to a fourth FET in a super source follower configuration, the third FET having a third FET gate coupled to a feedback loop of a voltage converter. The system also includes a voltage output coupled between a second FET source of the second FET and a fourth FET source of the fourth FET. The system also includes a comparator having a comparator output and first and second comparator inputs, the first comparator input coupled to the voltage output, the second comparator input coupled to a sawtooth voltage source, and the comparator output coupled to the voltage converter, the voltage converter having an output terminal coupled to the feedback loop.

DETAILED DESCRIPTION

Figure 1:
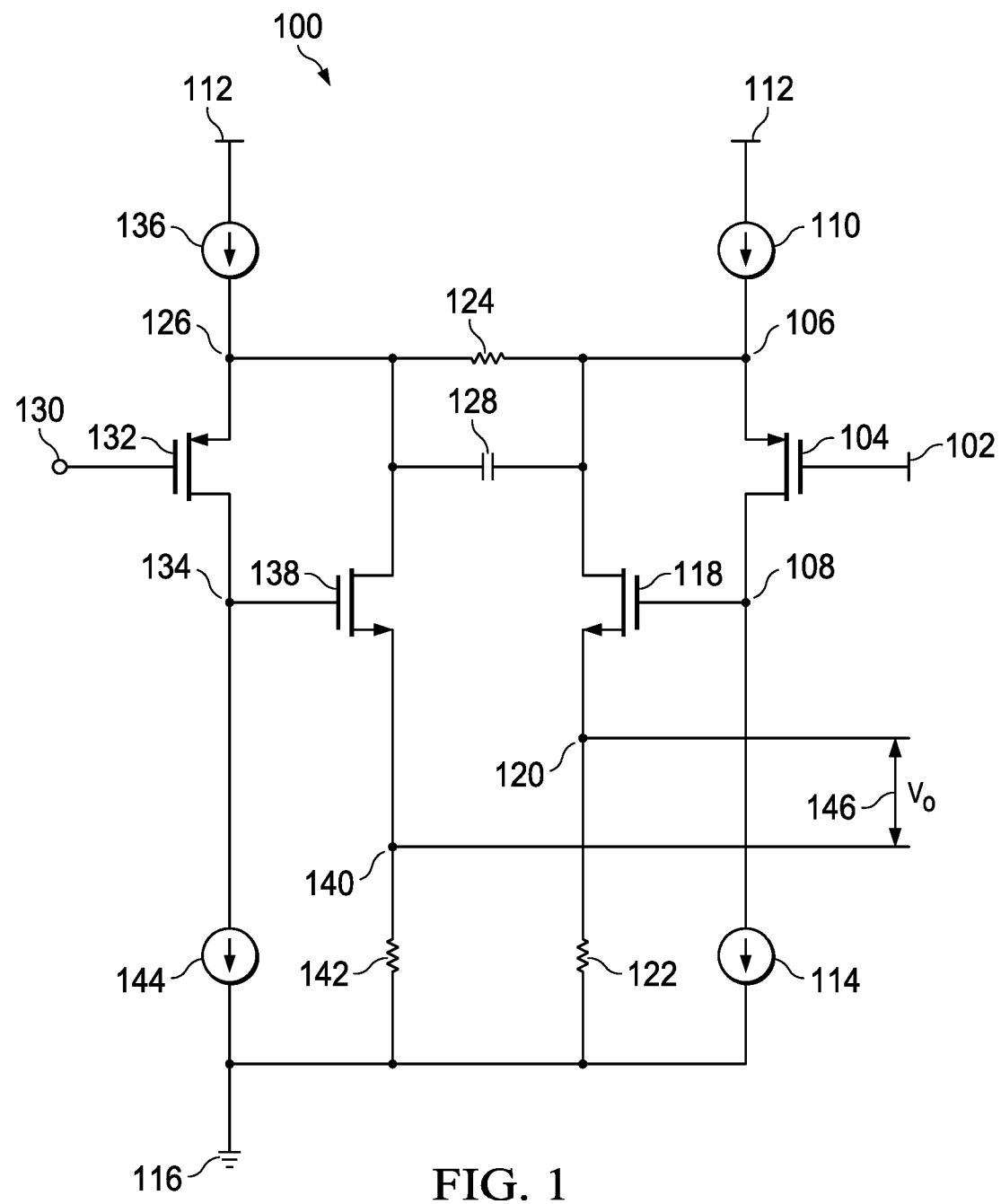
FIG. 1 is a schematic diagram of a loop compensation circuit in accordance with various examples.

Switching voltage regulators use switching techniques to provide a programmed output voltage from an input voltage. One type of switching regulator is a step-down voltage converter (also called a buck converter), which converts an applied direct current (DC) input voltage to a lower DC output voltage. Switching regulators use feedback control loops to ensure the programmed voltage and current output is maintained under varying load conditions. An engineer can measure the performance of the feedback control loop by measuring the frequency response of the switching regulator across a range of frequencies. The frequency response indicates how a switching regulator will react (determined by the voltage regulator's transfer function) under defined operating conditions across a range of frequencies (e.g., the frequency that the DC voltage is switched on and off during the pulse width modulation process). The frequency response is a dynamic model of the switching regulator showing how variations in the input voltage, the load, and duty cycle affect the output voltage across the range of switching frequencies. The frequency response is a dynamically tunable parameter that influences the switching regulator's reaction time, precision, and stability.

The frequency response can be tuned by incorporating a loop compensation circuit into the switching voltage regulator. Loop compensation helps to create a switching regulator that is stable over a wide frequency range yet is not overcompensated to a degree that results in a poor dynamic response. Similarly, proper loop compensation can increase the frequency range across which the switching regulator is stable. Loop compensation generally uses one of three approaches: constant on-time control, current mode control, or voltage mode control.

Constant on-time control provides bursts of energy for fixed periods to the output. The repetition rate of the bursts is varied to keep output voltage constant. In current mode control, current in an inductor is detected and used in a feedback loop along with a voltage feedback loop. In voltage mode control, the output voltage is returned through a feedback loop and then compensation is performed.

For loop compensation circuits that use feedback loops, phase margin and gain margin are parameters used to identify the effectiveness of the feedback loop. The gain (in decibels (dB)) and the phase (in degrees) can each be graphed versus a log scale of frequency. A feedback loop is unstable if the loop has unity gain (e.g., 0 dB) at the frequency where the phase passes through zero degrees. The gain margin is therefore the gain value at the frequency that the phase passes through zero degrees. Gain margin is measured in decibels. In an example, if the gain is 20 dB at the frequency where the phase passes through zero degrees, then the gain margin is 20 dB. Therefore, at this frequency the feedback loop has 20 dB of "extra" gain above the level where the system would become unstable.

Phase margin is the difference between −180 degrees and the phase at the frequency where the gain passes through 0 dB. A gain of 0 dB means that the output signal is the same magnitude as the input signal. The frequency at which the gain passes through 0 dB is the crossover frequency $f_c$. For example, if the crossover frequency $f_c$ is 25 kHz, and the phase at the crossover frequency $f_c$ is −120 degrees, then the phase margin is −120°−(−180°), or 60 degrees. Sufficient phase margin prevents oscillations. A positive phase margin is a "safety margin" that ensures proper operation of the circuit. Switching regulators are generally designed with phase margins well in excess of 0 degrees. A phase margin of 45 degrees or greater is generally a design goal for a system.

Various factors, however, can reduce phase margin. For example, voltage mode control converters exhibit good noise margin and a low impedance output. In one conventional approach, fixed frequency voltage mode control converters used tantalum output filter capacitors. The resistive losses of the tantalum capacitor are collectively known as equivalent series resistance (ESR). This inherent ESR provided the system with a compensating "zero" for the voltage mode control converter. The concept of a "zero" is related to the transfer function of the voltage mode control converter. The transfer function of the voltage mode control converter describes how variations or disturbances in the input voltage lead to disturbances in the output voltage. When graphed in the s-plane (a plane of real and imaginary numbers), a "zero" of the transfer function corresponds to a value of the complex frequency where the numerator of the transfer function equals zero (e.g., the gain equals zero at this complex frequency). Likewise, a "pole" of the transfer function corresponds to a value of the complex frequency where the denominator of the transfer function equals zero (e.g., the gain is infinite at this complex frequency). The values of the poles and zeros determine whether the voltage mode control converter is stable and how well it performs. The inherent ESR provided by the tantalum capacitor thus provided a zero for the system, which made the system stable.

As resistance is increased in a voltage mode control converter, the phase margin increases as well. However, as capacitors became more efficient, the ESR of the capacitors was reduced. Lower resistance in the capacitors therefore also reduced the phase margin.

Because more efficient capacitors resulted in reduced phase margin, in another conventional approach an active gain circuit is employed to introduce a "zero" in the feedback loop and thereby increase the phase margin. The active gain circuit provides an adequate phase boost to increase the frequency range but also increases quiescent current. The magnitude of increase in the frequency range is therefore limited by the quiescent current.

Examples described herein relate to voltage mode control systems for a voltage converter and provide a loop compensation circuit that produces greater increases in gain margin and phase margin boost for a given quiescent current compared to conventional approaches. In another example, the quiescent current can be reduced compared to conventional approaches. In yet another example, a greater increase in gain margin and phase margin boost can be achieved along with a reduction in quiescent current. The loop compensation circuit described in the examples herein provides compensation for a switching regulator without a detrimental increase in quiescent current. The examples below use switching regulators that are voltage converters, although other types of switching regulators can be implemented in other examples.

In an example, a loop compensation circuit for a voltage converter includes a first FET coupled to a second FET in a super source follower configuration. The loop compensation circuit further includes a third FET coupled to a fourth FET in a super source follower configuration. A gate of the first FET is configured to receive a reference signal, and a gate of the third FET is configured to receive an output voltage of the voltage converter through a feedback loop. Four current sources bias the four FETS in the loop compensation circuit. As described below, increasing the gate to source voltage of the second FET and the fourth FET increases the drain current of those FETS. The increase in drain current reduces the impedance at the drain terminals of the second FET and the fourth FET. Phase boost is limited by this impedance, and therefore reduced impedance allows for a higher phase boost. Reduced impedance also allows for a lower quiescent current while still providing adequate compensation for the voltage converter. In some examples, a combination of increased phase boost and lower quiescent current can be realized in a voltage mode control converter comprising the loop compensation circuit. The loop compensation circuit examples described herein can provide an appropriate phase boost, gain boost, quiescent current, and/or frequency range for a given application.

Examples of the loop compensation circuit are described as compensating a voltage converter that steps down voltage from an input to an output (e.g., a buck converter). However, the loop compensation techniques described are useful for any other suitable type of voltage converter, such as boost regulators, buck-boost regulators, and the like. In an example, the transistors used in the loop compensation circuit are implemented as FETS, and more specifically, metal oxide semiconductor FETs (MOSFETS), but any other suitable solid state transistor devices may also be useful.

FIG. 1 is a schematic diagram of a loop compensation circuit 100 according to one example. Loop compensation circuit 100 includes a reference voltage terminal 102 coupled to a gate of a first FET 104. First FET 104 is a p-channel MOSFET in one example. A source of first FET 104 is coupled to node 106, while a drain of first FET 104 is coupled to node 108. Node 106 is also coupled to a first current source 110. First current source 110 is also coupled to a voltage source 112. A drain of first FET 104 is coupled to node 108, which is coupled to a second current source 114. Second current source 114 is also coupled to ground 116.

Loop compensation circuit 100 further includes a second FET 118 with a gate coupled to node 108. Second FET 118 is an n-channel MOSFET in one example. A drain of second FET 118 is coupled to node 106, and a source of second FET 118 is coupled to node 120. Node 120 is coupled to resistor 122, and resistor 122 is coupled to ground 116. Second FET 118 is coupled to first FET 104 in a super source follower configuration. In the super source follower configuration, the source of a first FET is coupled to the drain of a second FET. Also, the gate of the second FET is coupled to the drain of the first FET. As the drain current of the first FET increases, gate to source voltage of the second FET increases. Increasing the gate to source voltage of the second FET increases the drain current of the second FET, which reduces the impedance of the second FET. The phase boost is hindered by this impedance, so reducing this impedance allows for a higher phase boost to be achieved.

Loop compensation circuit 100 further includes a resistor 124 coupled between nodes 106 and 126, and a capacitor 128 also coupled between nodes 106 and 126. A feedback terminal 130 is coupled to a gate of a third FET 132. Third FET 132 includes a p-channel MOSFET in one example. A drain of third FET 132 is coupled to node 134. A source of third FET 132 is coupled to node 126, which is coupled to third current source 136. Third current source 136 is also coupled to a voltage source 112.

Loop compensation circuit 100 further includes a fourth FET 138 with a gate coupled to node 134. Fourth FET 138 is an n-channel MOSFET in one example. A drain of fourth FET 138 is coupled to node 126, and a source of fourth FET 138 is coupled to node 140. Node 140 is coupled to resistor 142, and resistor 142 is coupled to ground 116. A fourth current source 144 is coupled to node 134. Fourth current source 144 is also coupled to ground 116.

As with first FET 104 and second FET 118 described above, fourth FET 138 is coupled to third FET 132 in a super source follower configuration. Third FET 132 and fourth FET 138 operate similarly in the super source follower configuration, where an increase in drain current of third FET 132 increases the drain current in fourth FET 138, reducing the impedance of fourth FET 138. Reducing this impedance allows for a higher phase boost to be achieved by loop compensation circuit 100.

In operation, loop compensation circuit 100 provides loop compensation for a voltage mode control converter. Current sources 110, 114, 136, and 144 provide current to the circuit. In one example operation, first current source 110 and third current source 136 each provide a bias current of $2I_B$ amps, while second current source 114 and fourth current source 144 each provide a bias current of $I_B$ amps. With this configuration, approximately $I_B$ amps of current flows through resistor 122 and resistor 142. Any appropriate values of $I_B$ may be provided. For proper operation, first current source 110 should provide more current than second current source 114, and third current source 136 should provide more current than fourth current source 144. In this example, first current source 110 and third current source 136 each provide twice the current of second current source 114 and fourth current source 144, but other ratios are useful in other examples. Also, in this example first current source 110 and third current source 136 provide approximately the same amount of current, but those amounts may vary in other examples. Likewise, second current source 114 and fourth current source 144 provide approximately the same amount of current in this example, but those amounts may vary in other examples.

Reference voltage terminal 102 coupled to the gate of first FET 104 is configured to receive a reference voltage. The value of the reference voltage received by reference voltage terminal 102 is selected by the circuit designer. In an example, the reference voltage received by the reference voltage terminal 102 is equal to the programmed output voltage of the voltage converter. The reference voltage received by the reference voltage terminal 102 is used by loop compensation circuit 100 to determine the difference between the programmed output voltage of the voltage converter and the actual output voltage of the voltage converter, in order to correct the output voltage using the loop compensation circuit 100. The actual output voltage terminal of the voltage converter (not shown in FIG. 1) for which loop compensation circuit 100 provides compensation is coupled to the gate of the third FET 132 via a feedback loop coupled to feedback terminal 130. If the reference voltage received by reference voltage terminal 102 differs from the output voltage of the voltage converter on feedback terminal 130, a voltage differential $V_O$ 146 can be measured between nodes 120 and 140. The voltage differential $V_O$ 146 is a measure of the difference between the reference voltage received at the reference voltage terminal 102 and the output voltage of the voltage converter. The voltage differential $V_O$ 146 is used by additional circuitry (not shown in FIG. 1) as part of a feedback loop to adjust the voltage converter and stabilize its output voltage. Therefore the feedback loop and loop compensation circuit 100 compensate the voltage converter to maintain the voltage converter's output voltage at a programmed value.

The values of resistor 124 and capacitor 128 determine the zero frequency $F_o$ of the circuit. The zeros are the roots of the numerator of the transfer function. In this example, $F_o=1/(2\pi RC)$, where R is the value of resistor 124 and C is the value of capacitor 128. The values of resistor 124 and capacitor 128 can be selected to achieve a specific $F_o$. Also, the ratio of the value of resistor 124 to resistors 122 and 142 determine the DC gain of loop compensation circuit 100. In this example, if the resistances of resistors 122 and 142 are equal, the gain equals $R_{122}/(R_{124}/2)$, where $R_{122}$ is the value of resistor 122 and $R_{124}$ is the value of resistor 124. Therefore the values of these resistors 122, 124, and 142 can be selected to provide a specific DC gain for loop compensation circuit 100.

Figure 2:
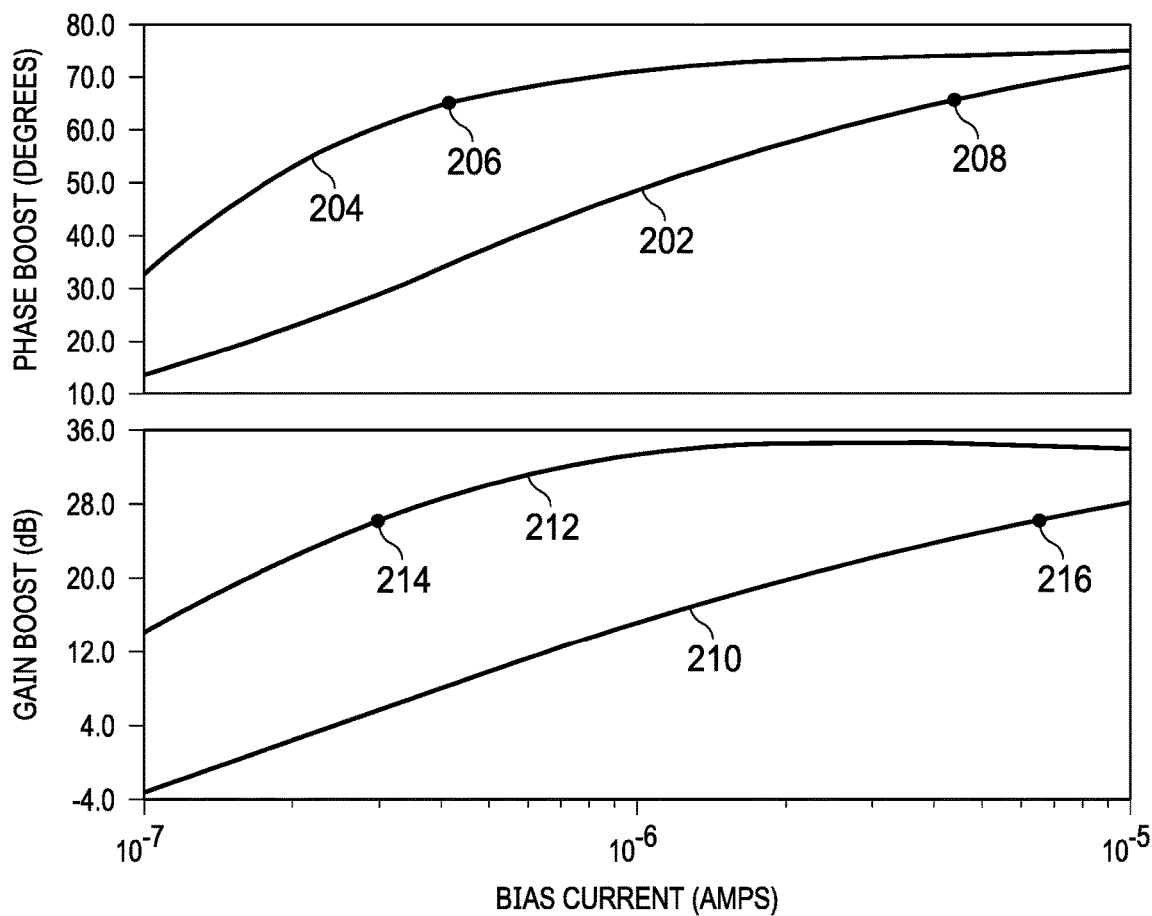
FIG. 2 is a graph of phase boost and gain boost in accordance with various examples.

FIG. 2 is a graph 200 of phase boost and gain boost in accordance with various examples. Graph 200 is one example of phase boost and gain boost provided by loop compensation circuit 100. The top half of graph 200 is a graph of the phase boost. Phase boost is the increase (measured in degrees) of the phase margin graphed versus bias current. The bottom half of graph 200 is a graph of the gain boost. Gain boost is the increase in gain (measured in dB) graphed versus bias current.

The phase boost of a conventional approach is shown in curve 202. Curve 204 and point 206 show the phase boost provided by loop compensation circuit 100 in an example. With the conventional approach of curve 202, a phase boost of 65 degrees is shown at point 208. As shown at point 208, the conventional loop compensation circuit uses a bias current of approximately 4.5 microamps to achieve a 65 degree phase boost. In loop compensation circuit 100, a 65 degree phase boost is achieved with a bias current of approximately 450 nanoamps (shown at point 206 of curve 204), roughly ¹⁄₁₀ of the bias current used in the conventional approach. Therefore loop compensation circuit 100 can adequately increase the phase margin of a voltage converter while reducing the current used to provide the compensation.

The gain boost of a conventional approach is shown in curve 210. The gain boost provided by loop compensation circuit 100 is shown with curve 212 and point 214. With the conventional approach, a gain boost of 26 dB is shown at point 216. As shown at point 216, the conventional loop compensation circuit uses a bias current of approximately 4.5 microamps to achieve a 26 dB gain boost. In contrast, curve 212 is a graph of the gain boost provided by loop compensation circuit 100 in an example. As shown in curve 212, loop compensation circuit 100 provides a 26 dB gain boost with a bias current of approximately 250 nanoamps (shown at point 214), roughly 1/18 of the bias current used in the conventional approach. Therefore loop compensation circuit 100 can adequately increase the gain margin of a voltage converter while reducing the bias current used to provide the loop compensation.

FIG. 2 indicates that a large increase in phase boost and gain boost can be achieved for a given current compared to a conventional approach. In another example, loop compensation circuit 100 can achieve a similar phase boost and gain boost as in the conventional approach, but with a much smaller bias current in loop compensation circuit 100. Alternatively, both the phase boost and gain boost can be increased while the bias current is reduced in loop compensation circuit 100 compared to conventional approaches.

Figure 3:
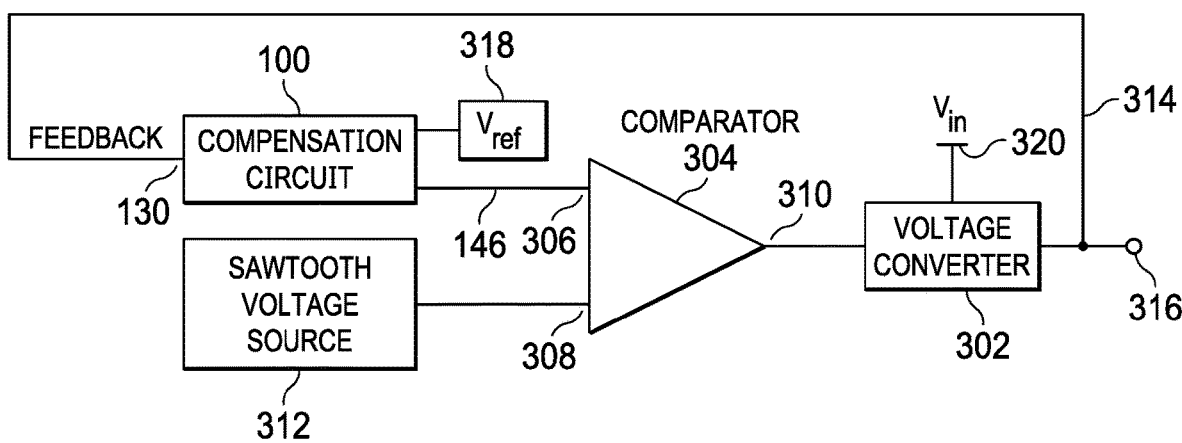
FIG. 3 is a schematic diagram of a system in accordance with various examples.

FIG. 3 is an example of a schematic diagram of a system 300 according to an example. In one example, system 300 includes a component of a power management unit for an embedded processor. System 300 includes a voltage converter 302. Voltage converter 302 is a voltage mode switch-mode converter in this example. Voltage converter 302 is also a buck converter in this example. In other examples, voltage converter 302 can include a boost converter, a buck-boost converter, or any other type of voltage converter. System 300 includes voltage converter 302, comparator 304 (including comparator input 306, comparator input 308, and comparator output 310), sawtooth voltage source 312, feedback loop 314, and output terminal 316. The system 300 also includes a reference voltage source 318, which couples to the voltage reference terminal 102 shown in FIG. 1 and provides the reference voltage to the voltage reference terminal 102. In operation, voltage converter 302 receives a DC input voltage from voltage terminal $V_{in}$ 320 and produces a DC output voltage at output terminal 316. The remaining components in system 300 provide loop compensation for voltage converter 302. These components stabilize the operation of voltage converter 302 and provide adequate phase margin and gain margin for voltage converter 302. In this example, adequate phase margin and gain margin are provided without a large increase in quiescent current.

In operation, voltage converter 302 produces an output voltage at output terminal 316. Ideally, the output voltage matches the reference voltage and the voltage converter 302 operates as designed. However, in real-world conditions, changes to the load or variations in input voltage may cause the output voltage to fluctuate to some degree. The compensation loop responds to this fluctuation in output voltage and regulates the output voltage back to the designed value. To accomplish this compensation, feedback loop 314 connects output terminal 316 to loop compensation circuit 100. The voltage at output terminal 316 is provided to feedback terminal 130, which is coupled to the gate of third FET 132 (not shown in FIG. 3), as described above with respect to FIG. 1.

Reference voltage source 318 provides a reference voltage to loop compensation circuit 100, as described above with respect to FIG. 1. The reference voltage is applied to the gate terminal of first FET 104. Loop compensation circuit 100 therefore receives a reference voltage at the gate of first FET 104 and a feedback voltage at the gate of third FET 132.

Loop compensation circuit 100 provides an output responsive to the difference in these voltages at voltage differential $V_O$ 146, as described above with respect to FIG. 1.

Referring again to FIG. 3, voltage differential $V_O$ 146 is provided to comparator input 306 of comparator 304. Comparator 304 receives an input voltage at each of its input terminals and provides a voltage at the comparator output that indicates which input voltage is larger. Comparator 304 includes a second comparator input 308 coupled to a sawtooth voltage source 312. A sawtooth voltage is a voltage that increases at a certain rate up to a certain point and then drops rapidly to its original voltage. A sawtooth voltage repeats this rise and drop cycle at a fixed frequency.

Comparator 304 provides an output signal at comparator output 310. The output signal of comparator 304 is then provided to voltage converter 302. The output of comparator 304 is a pulse-width modulation (PWM) signal that is provided to voltage converter 302 to control voltage converter 302. The duty cycle of the PWM signal is proportional to the voltage differential $V_O$ 146, which determines the percentage of the time that the switching elements within voltage converter 302 conduct. The percentage of time conducting, in turn, determines the output voltage of voltage converter 302. As the voltage differential $V_O$ 146 changes due to fluctuations in the voltage on feedback loop 314, system 300 adjusts and regulates the input to voltage converter 302 to stabilize the output voltage at output terminal 316. For example, if the output voltage of voltage converter 302 is too high compared to the reference voltage from reference voltage source 318, comparator 304 will provide a PWM signal that results in a lower voltage at the output terminal 316 of voltage converter 302. Conversely, if the output voltage of voltage converter 302 is too low compared to the reference voltage from reference voltage source 318, comparator 304 will provide a PWM signal that results in a higher voltage at the output terminal 316 of voltage converter 302. System 300 therefore continually regulates the output voltage of voltage converter 302 while in operation. Also, by utilizing the super source follower configurations of FETS that include loop compensation circuit 100, system 300 provides adequate phase margin and gain margin without a large increase in quiescent current.

FIG. 3 is an example system that uses loop compensation circuit 100 to provide loop compensation for voltage converter 302. Other examples may use loop compensation circuit 100 in configurations with different components to provide loop compensation for voltage converter 302. Voltage converter 302 can include a buck converter, boost converter, buck-boost converter, or any suitable type of voltage converter in other examples.

As described above with respect to FIGS. 1 and 2, loop compensation circuit 100 provides an increase in phase boost and gain boost for voltage converter 302, without a large increase in quiescent current. Results such as those shown in FIG. 2 are achieved in some examples. For example, a phase boost of 65 degrees can be achieved with a bias current of approximately 450 nanoamps. A designer of a loop compensation circuit can design the compensation circuit to achieve a specific phase boost or to achieve a specific quiescent current. In some examples, the designer can attain both a reduced quiescent current and an increased phase boost compared to conventional approaches. In an example, the phase boost can be selected to increase the frequency range of the output to a programmed level.

In this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components illustrated as resistors, unless otherwise stated, are generally representative of any one or more elements coupled in series and/or parallel to provide an amount of impedance represented by the illustrated resistor. For example, a resistor or capacitor illustrated and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means+/−10 percent of the stated value.

Modifications are possible in the described examples, and other examples are possible, within the scope of the claims.

What is claimed is:

1. A circuit, comprising:
   first, second and third resistors, wherein the third resistor has first and second resistor terminals;
   a capacitor coupled in parallel with the third resistor;
   a first transistor having a first control terminal, a first current terminal, and a second current terminal, wherein the first control terminal is coupled to a reference voltage terminal, the first current terminal is coupled to the first resistor terminal, and the first transistor conducts a first current from the first current terminal to the second current terminal responsive to a first voltage at the first control terminal;
   a second transistor having a second control terminal, a third current terminal, and a fourth current terminal, wherein the second control terminal is coupled to the second current terminal, the third current terminal is coupled to the first resistor terminal, the fourth current terminal is coupled to a ground terminal through the first resistor, and the second transistor conducts a second current from the third current terminal to the ground terminal via the fourth current terminal and the first resistor responsive to a second voltage at the second control terminal;
   a third transistor having a third control terminal, a fifth current terminal, and a sixth current terminal, wherein the third control terminal is coupled to a feedback voltage terminal, the fifth current terminal is coupled to the second resistor terminal, and the third transistor conducts a third current from the fifth current terminal to the sixth current terminal responsive to a third voltage at the third control terminal; and
   a fourth transistor having a fourth control terminal, a seventh current terminal, and an eighth current terminal, wherein the fourth control terminal is coupled to the sixth current terminal, the seventh current terminal is coupled to the second resistor terminal, the eighth current terminal is coupled to the ground terminal via the second resistor, and the fourth transistor conducts a fourth current from the seventh current terminal to the ground terminal via the eighth current terminal and the second resistor responsive to a fourth voltage at the fourth control terminal.

2. The circuit of claim 1, further comprising:
   a first current source coupled to the first and third current terminals and configured to supply the first and second currents to the respective first and third current terminals;
   a second current source coupled between the second current terminal and the ground terminal and configured to sink the first current;
   a third current source coupled to the fifth and seventh current terminals and configured to supply the third and fourth currents to the respective fifth and seventh current terminals; and
   a fourth current source coupled between the sixth current terminal and the ground terminal and configured to sink the third current.

3. The circuit of claim 2, wherein:
   the first current equals the second current; and
   the third current equals the fourth current.

4. The circuit of claim 1, wherein a first voltage difference between the fourth and eighth current terminals represents a second voltage difference between the first voltage at the reference voltage terminal and the third voltage at the feedback voltage terminal.

5. The circuit of claim 1, wherein the first and second transistors are configured to be a first super source follower, and the third and fourth transistors are configured to be a second super source follower.

6. The circuit of claim 1, wherein:
   the first and third transistors are p-channel transistors; and
   the second and fourth transistors are n-channel transistors.

7. A circuit, comprising:
   first, second and third resistors, wherein the third resistor has first and second resistor terminals;
   a capacitor coupled in parallel with the third resistor;

a first super source follower circuit having a first source follower control terminal, a first source follower current terminal, and a second source follower current terminal, the first source follower control terminal coupled to a reference voltage terminal, the first source follower current terminal coupled to the first resistor terminal, and the second source follower current terminal coupled to the first resistor;

a second super source follower circuit having:
  a first transistor having a first control terminal and first and second current terminals, wherein the first control terminal is coupled to a feedback voltage terminal, the first current terminal is coupled to the second resistor terminal, and the first transistor conducts a first current from the first current terminal to the second current terminal responsive to a first voltage at the first control terminal; and
  a second transistor having a second control terminal and third and fourth current terminals, wherein the second control terminal is coupled to the second current terminal, the third current terminal is coupled to the second resistor terminal, the second current terminal is coupled to the ground terminal via the second resistor, and the second transistor conducts a second current from the third current terminal to the ground terminal via the fourth current terminal and the second resistor responsive to a second voltage at the second control terminal.

8. The circuit of claim 7, wherein the feedback voltage terminal is coupled to an output of a voltage converter, and the circuit is configured to provide loop compensation for the voltage converter.

9. The circuit of claim 7, wherein a first voltage difference between the second source follower current terminal and the fourth current terminal represents a second voltage difference between a reference voltage at the reference voltage terminal and a feedback voltage at the feedback voltage terminal.

10. The circuit of claim 7, wherein the first super source follower circuit includes:
  a third transistor having a third control terminal and fifth and sixth current terminals, wherein the third control terminal is coupled to the first source follower control terminal, and the fifth current terminal is coupled to the first source follower current terminal; and
  a fourth transistor having a fourth control terminal and seventh and eighth current terminals, wherein the fourth control terminal is coupled to the sixth current terminal, the seventh current terminal is coupled to the first source follower control terminal, and the eighth current terminal is coupled to the second source follower current terminal.

11. The circuit of claim 10, further comprising:
a first current source coupled to the first source follower current terminal;
a second current source coupled to the sixth current terminal;
a third current source coupled to the fourth control terminal; and
a fourth current source coupled to the second current terminal.

12. The circuit of claim 11, wherein:
the first and third current sources are configured to provide a respective first current;
the second and fourth current sources are configured to provide a respective second current; and
the first current is twice of the second current.

13. The circuit of claim 7, wherein a zero frequency of the circuit is based on a capacitance of the capacitor and a resistance of the third resistor.

14. A system, comprising:
a compensation circuit having a reference voltage terminal, a feedback voltage input, and first and second outputs, the compensation circuit including:
  a resistor and a capacitor coupled in parallel, the resistor having first and second resistor terminals;
  a first source follower circuit having a first source follower control terminal, a first source follower current terminal, and a second source follower current terminal, the first source follower control terminal coupled to the reference voltage terminal, the first source follower current terminal coupled to the first resistor terminal, and the second source follower current terminal coupled to the first output; and
  a second source follower circuit having a second source follower control terminal, a third source follower current terminal, and a fourth source follower current terminal, the second source follower control terminal coupled to the feedback voltage input, the third source follower current terminal coupled to the second resistor terminal, and the fourth source follower current terminal coupled to the second output;
a comparator having a comparator output, first and second comparator inputs and a sawtooth voltage terminal, the first comparator input coupled to the first output, and the second comparator input coupled to the second output; and
a voltage converter having a control input, a voltage input terminal, and a voltage output, the control input coupled to the comparator output and the voltage output coupled to the feedback voltage input.

15. The system of claim 14, wherein the voltage converter is a buck converter.

16. The system of claim 14, wherein the first source follower circuit has a super source follower configuration and includes:
  a first transistor having a first transistor control terminal, a first transistor current terminal, and a second transistor current terminal, the first transistor control terminal coupled to the first source follower control terminal, and the first transistor current terminal coupled to the first source follower current terminal; and
  a second transistor having a second transistor control terminal, a third transistor current terminal, and a fourth transistor current terminal, the second transistor control terminal coupled to the second transistor current terminal, the third transistor current terminal coupled to the first source follower control terminal, and the fourth transistor current terminal coupled to the second source follower current terminal; and
  wherein the second source follower circuit has a super source follower configuration and includes:
  a third transistor having a third transistor control terminal, a fifth transistor current terminal, and a sixth transistor current terminal, the third transistor control terminal coupled to the second source follower control terminal, and the fifth transistor current terminal coupled to the third source follower current terminal; and
  a fourth transistor having a fourth transistor control terminal, a seventh transistor current terminal, and an eighth transistor current terminal, the fourth transistor control terminal coupled to the sixth transistor current terminal, the seventh transistor current terminal coupled to the third source follower current terminal, and the eighth transistor current terminal coupled to the fourth source follower current terminal.

17. The system of claim 16, further comprising:
a first current source coupled to the first source follower current terminal;
a second current source coupled to the second transistor current terminal;
a third current source coupled to the second source follower current terminal; and
a fourth current source coupled to the sixth transistor current terminal.

18. The system of claim 17, wherein:
the first and third current sources are configured to provide a respective first current; the second and fourth current sources are configured to provide a respective second current; and
the first current is twice of the second current.

19. The system of claim 14, wherein a first voltage difference between the first and second outputs represents a second voltage difference between a reference voltage at the reference voltage terminal and a feedback voltage provided at the voltage output of the voltage converter.

* * * * *